(12) United States Patent
Lim et al.

(10) Patent No.: US 6,295,320 B1
(45) Date of Patent: Sep. 25, 2001

(54) INVERSE DISCRETE COSINE TRANSFORMING SYSTEM FOR DIGITAL TELEVISION RECEIVER

(75) Inventors: Il-Taek Lim, Seoul; Seong Ok Bae, Kyungki-do; Seung-Jai Min, Seoul; Won-Jun Her, Kyungki-do, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/221,983

(22) Filed: Dec. 29, 1998

(30) Foreign Application Priority Data

Dec. 31, 1997 (KR) .................................. 97-80706
Dec. 31, 1997 (KR) .................................. 97-81042

(51) Int. Cl.$^7$ ..................................... H04N 7/12
(52) U.S. Cl. ................. 375/240.2; 375/240.18; 382/250; 708/190; 708/402
(58) Field of Search ............ 375/240.18, 240.2, 375/240.21, 240.24, 240.25; 348/403.1, 405.1, 404.1, 420.1; 382/248, 250; 708/190, 400, 401, 402, 203

(56) References Cited

U.S. PATENT DOCUMENTS

| | | | |
|---|---|---|---|
| Re. 34,734 | * 9/1994 | Cambonie | 708/402 |
| 5,053,985 | * 10/1991 | Friedlander et al. | 708/402 |
| 5,181,183 | * 1/1993 | Miyazaki | 708/402 |
| 5,249,146 | * 9/1993 | Uramoto et al. | 708/402 |
| 5,345,408 | * 9/1994 | Hoogenboom | 708/402 |
| 5,452,466 | * 9/1995 | Fettweis | 712/36 |
| 5,574,661 | * 11/1996 | Cismas | 709/247 |
| 5,610,849 | * 3/1997 | Huang | 708/401 |
| 5,636,152 | * 6/1997 | Yang et al. | 708/401 |
| 5,671,169 | * 9/1997 | Huang | 708/402 |
| 5,724,278 | * 3/1998 | Ohgose et al. | 708/401 |
| 5,825,420 | * 10/1998 | Yang et al. | 348/403 |
| 5,986,709 | * 11/1999 | Lee | 348/403 |
| 5,995,990 | * 11/1999 | Henry | 708/402 |

* cited by examiner

*Primary Examiner*—Vu Le
(74) *Attorney, Agent, or Firm*—Fleshner & Kim, LLP

(57) ABSTRACT

An inverse discrete cosine transforming (IDCT) system for a digital television receiver performing a variable length decoding and an inverse quantization of an applied bit stream and an IDCT with respect to inversely quantized DCT coefficients, including an integrated IDCT part which performs an inverse discrete cosine transformation of standards DCT coefficients inversely quantized or high definition DCT coefficients inversely quantized.

14 Claims, 10 Drawing Sheets

8times
row-wise IDCT

8times
column-wise IDCT

INVERSE DISCRETE COSINE TRANSFORMING SYSTEM FOR DIGITAL TELEVISION RECEIVER

BACKGROUND OF THE INVENTION

1. Field of the Invention

The present invention relates to a digital television receiver which receives compressed video signals and decodes them to display on a monitor, and more particularly to an inverse discrete cosine transforming (IDCT) system which performs an inverse discrete cosine transformation with respect to DCT coefficients inversely quantized.

2. Discussion of Related Art

In recent years, digital television (TV) broadcasting is making rapid progress, and the techniques of compressing and transmitting video data become very important. The moving pictures expert group (MPEG) standards are international ones for compression coding of digital picture, and applied to a digital versatile disk (DVD) and a digital TV.

In the presently available digital TV the MPEG compression and restoration of high definition become the actual standards, which means that the conventional analog TVs come to be replaced with digital TVs gradually. However, since HDTVs are considerably expensive in the early stage, there may be the demand for televisions of standard definition (SD) in the transition from the analog TVs of NTSC to perfect HDTVs for a long period of time. The SDTVs do not display HD signals on an HD monitor but performs a down-conversion with respect to HD signals and display them on SD monitors, i.e. NTSC TVs or PC monitors. This SDTV can also receive SD signals. The SDTV can convert 1920 pixels×1080 lines, 60 Hz interlaced scan HD signals into 720 pixels×480 lines,60 Hz interlaced scan SD signals for broadcasting, and may use 720 pixels×480 lines, 60 Hz interlaced scan SD signals without conversion.

Digital TV receivers for SDTV are divided into HD and SD levels according to the number of pixels considering factors influencing the sharpness/picture quality. A transmitting part absolutely requires the removal of a temporal redundancy as well as the removal of a redundancy in the two-dimensional space that the video data has in order to efficiently compress the video bit stream that varies with the time. For example, the MPEG employs the motion compensation technique to recude the temporal redundancy and DCT to reduce the redundancy in the two-dimensional space. The picture is divided by blocks by a method of removing data correlation through two-dimensional pivotting, and each block is pivotted by DCT algorithm. The pivotted data tend to one direction (e.g. low-pass direction), and the data are quantized and transmitted.

A decoder of the digital TV for SDTV, is shown in FIG. 1. One pixel is expressed as 8 bits, and one macro block has 16×16 pixel data. This decoder receives the bit stream including the motion vector information.

A variable length decoder (VLD) 101 performs a variable length decoding with respect to the applied bit stream and divides it into motion vector, quantization value, DCT coefficients. An inverse quantizer 102 inversely quantizes DCT coefficients produced from VLD 101 and applies it to a demultiplexer 103. Demultiplexer 103 produces the 8×8 DCT coefficients inversely quantized in response to a selection signal to an 8×8 IDCT 104, and removes a high frequency area of a horizontal part of inversely quantized 8×8 DCT coefficients and produces 8×4 DCT coefficients to 8×4 IDCT 105. 8×8 IDCT 104 performs an IDCT in the unit of 8×8 with respect to the inversely quantized 8×8 DCT coefficients, and 8×4 IDCT 105 performs an IDCT in the unit of 8×4 with respect to the inversely quantized 8×4 DCT coefficients and produces them to an adder 107 through a multiplexer 106.

Adder 107 adds motion compensated data to the IDCT data and restores to a perfect picture to store the restored picture in a frame memory 109. The restored original picture signal is video out for display and simultaneously feeds back to a motion compensator 108 for motion compensation. Motion compensator 108 compensates the motion of the current frame by using motion vectors produced from VLD 101 and pixel values of frame memory 109, and then outputs it to adder 107.

Demultiplexer 103 produces inversely quantized 8×8 DCT coefficients to 8×8 IDCT 104 if the applied signal is SD one. If the applied signal HD one, after removing a high frequency area of the horizontal part of the inversely quantized 8×8 DCT coefficients, demultiplexer 103 produces 8×4 DCT coefficient to 8×4 IDCT 105.

The current MPEG standards propose two-dimensional IDCT of 8×8 block. Thus, 8×8 IDCT 104 and 8×4 IDCT 105 perform two-dimensional IDCT. 8×8 2-D IDCT equation is expressed as equation 1.

$$f(x, y) = \frac{1}{4} \sum_{u=0}^{7} \sum_{v=0}^{7} C(u)C(v)F(u, v)\cos\left[\frac{\pi(2u+1)x}{16}\right]\cos\left[\frac{\pi(2v+1)y}{16}\right]$$ [Equation 1]

wherein u,v,x,y=0,1,2, . . . , 7

$$C(u) = \frac{1}{\sqrt{2}}, \text{ for } u = 0$$

$$C(v) = \frac{1}{\sqrt{2}}, \text{ for } v = 0$$

$$= 1 \text{ otherwise,}$$

wherein x and y are coordinates in PEL domain and u and v are a coordinates in transform domain.

8×8 2-D IDCT 104 which processes DCT coefficients of standard definition includes one-dimensional 8×1 IDCT operation part 202, a transposition part 203, and a one-dimensional 8×1 IDCT 204, as shown in FIG. 2a.

A one-dimensional 8×1 IDCT operation part 202 of 8×8 2-D IDCT 104 of FIG. 2a performs a one-dimensional IDCT with respect to DCT coefficients of 8×8 block applied through demultiplexer 103, and produces it to transposition part 203 as shown in FIG. 2b. Transposition part 203 performs a column-row, i.e. a horizontal-vertical transposition. One-dimensional 8×1 IDCT 204 performs one-dimensional 8×1 IDCT of an output of transposition part 203 in the vertical direction, as shown in FIG. 2c, thus completing 8×8 two-dimensional IDCT and obtaining an image block 205.

One-dimensional 8×1 IDCT operation part 204 in FIG. 2a includes an 8×1 IDCT operation part 206 and a rounding part 207, as shown in FIG. 2d, and the 1-D rounding part is different from that of 2-D according to the MPEG standards.

Since the digital TV receiver for SDTV receives and decodes SD data, there is no trouble in performance of IDCT with respect to SD data by 8×8 IDCT 104 , but performing IDCT of HD data is problematic. As described above, the number of HD pixels is six times larger than that of SD pixels. If signals applied to demultiplexer 103 are HD signals, horizontal decimation is performed with respect to 8×8 DCT coefficients, thus applying 8×4 DCT coefficients to 8×4 IDCT 105. When 8×4 IDCT 105 performs a two-dimensional IDCT, 8×4 2-D IDCT equation is as follows:

$$f(x, y) = \frac{1}{4}\sum_{u=0}^{3}\sum_{v=0}^{7} C(u)C(v)F(u, v)\cos\left[\frac{\pi(2u+1)x}{16}\right]\cos\left[\frac{\pi(2v+1)y}{16}\right]$$

wherein x, u=0, 1, 2, 3, and 4
y, v=0,1,2, . . . , 7

8×4 2-D IDCT 105, as shown in FIG. 3a, includes a one-dimensional 8×1 IDCT operation part 301, a transposition part 302, and one-dimensional 4×1 IDCT operation part 303. Similarly, after one-dimensional 8×1 IDCT operation part 301 performs one-dimensional IDCT with respect to the applied HD 8×4 DCT coefficients, transposition part 302 performs column-row transposition, and one-dimensional 4×1 IDCT operation part 303 performs one-dimensional 4×1 IDCT, thereby completing 8×4 two-dimensional IDCT.

FIG. 3b shows another embodiment of processing HD signals, and HD signals are converted into SD ones through filtering/decimation for downsampling. Signals of pictures affecting the picture quality, are downsampled to 8×4, and signals of a picture not affecting the picture quality are downsampled to 4×4. Methods of IDCT/downsampling to M×N(8×4) or N×N(4×4) are various and FIG. 3b shows one of them.

If the inversely quantized DCT coefficients are picture signals affecting the picture quality, a first IDCT and downsampling part 305 performs an IDCT of inversely quantized DCT coefficients, and performs a ½ downsampling in a horizontal direction to reduce to 8×4. The downsampled 8×4 DCT coefficients are applied to an adder 306 and added to motion-compensated data to be then applied to a third downsampling part 307 and stored in a frame memory 308. A motion compensator 309 reads a reference frame out of frame memory 308 by using a motion vector MV produced from VLD 101, and performs a motion compensation of the current frame to output it to adder 306.

Third downsampling part 307 performs low-pass filtering and vertical downsampling of 8×4 data produced from adder 306, and outputs it to multiplexer 310. A bit reduction encoding part and a bit decoding part may be placed prior to and behind frame memory 308 for reducing the size of frame memory 308. The bit reduction encoding part reduces the bit volume of the applied data by using correlation of the adjacent pixels, and stores the data in frame memory 308. The bit decoding part decodes the data produced from frame memory 308, and restores images for motion compensator 309.

If the inversely quantized DCT coefficients are signals not affecting the picture quality, a second IDCT and downsampling part 311 performs an IDCT of the DCT coefficients, and performs a ½ downsampling in a horizontal/vertical direction, thus reducing the 8×8 size to 4×4.

The downsampled 4×4 DCT coefficients are applied to an adder 312, and added to the motion compensated data to be transferred to multiplexer 310 and stored in a frame memory 313. A motion compensator 314 reads a reference frame out of the frame memory 313 by using a motion vector MV produced from VLD 101, and performs a motion compensation, thus transferring it to adder 312. A bit reduction encoding part and a bit decoding part may be placed prior to or behind frame memory 313 for reducing the size of frame memory 313. Decoding with respect to the picture not affecting the picture quality is carried out by repeating the above process.

Multiplexer 310 rearranges output of third down sampling part 307 and adder 312 and produces downsampled video signals of a desired size (video out). This desired size may refer to a picture of 720 pels×480 lines, and, in this case, third downsampling part 307 converts HDTV signals of 1080 lines into SDTV signals of 480 lines. When an SDTV receiver using MPEG2 receives and processes HD video signals, downsampling can be performed to make a picture affecting the picture quality of reproduced screen contain much information compared to a picture not affecting the picture quality, thus providing high picture quality.

FIG. 4 is a view for describing video source decoding by progressive scanning, and shows a 1-D IDCT/downsampling.

A horizontal 1-D IDCT/filtering and decimation 402 is performed with respect to image data of one block unit 401 to obtain IDCT and an 8×4 image block 403 downsampled, and if the 1-D IDCT and downsampling data are signals of a picture affecting the picture quality, a vertical 1-D IDCT 404 is performed only without downsampling, thereby obtaining an image block 405 of 8×4.

If the horizontal 1-D IDCT and downsampling data are signals of a picture not affecting the picture quality, the vertical 1-D IDCT/filtering and decimation 406 are performed to obtain an image block 407 of 4×4.

FIG. 5 is a view for describing the video source decoding by interlaced scanning having top and bottom fields, and shows the 1-D IDCT/downsampling (pixels of top and bottom fields are distinguished by black and white dots. That is, a horizontal 1-D IDCT/filtering and decimation 502 is performed with respect to image data of one block unit 501 having top and bottom fields, thus obtaining an 8×4 image block 503 IDCT and downsampled top and bottom fields. If the 1-D IDCT and downsampled data are signals with big importance, only vertical 1-D IDCT 504 is carried out without downsampling, thereby obtaining an image block 505 of top and bottom fields of 8×4. If the 1-D IDCT and downsampled data are signals of a picture not affecting the picture quality, vertical 1-D IDCT/filtering and decimation 506 is performed to obtain a 4×4 image block 507 with top and bottom fields.

FIG. 6a shows another preferred embodiment of 1-D IDCT for processing SD DCT coefficients. A 1-D IDCT 602 performs an JIDCT with respect to applied 8 DCT coefficients, and produces 8 pixels. 1-D IDCT 602 performs an IDCT with respect to the coefficient information for IDCT from a read only memory (ROM) 601. FIG. 6b is still another preferred embodiment of 1-D IDCT for processing HD DCT coefficients. A 1-D IDCT/filtering and decimation part 604 performs IDCT and downsampling with respect to applied 8 DCT coefficients, and produces four pixels. Part 604 receives the coefficient information for IDCT from a ROM 603.

In FIGS. 6a and 6b ROMs 601 and 602 each storing the coefficient information for IDCT provide IDCT coefficient values according to each mode. The 2-D IDCT and downsampling is depicted in FIGS. 2 to 5.

As mentioned above, the standard definition (SD) TV receiver requires two kinds of IDCTs in order to receive SD and HD video signals and display them. That is, as shown in FIGS. 1, 6a and 6b, IDCT for decoding HD video signals and IDCT for decoding SD video signals are individually required, and extra read only memories(ROMs) holding the IDCT coefficient information corresponding to each of two decoding modes must be provided, which increases the manufacturing cost.

SUMMARY OF THE INVENTION

Accordingly, the present invention is directed to an IDCT system for a digital television receiver that substantially obviate one or more of the problems due to limitations and disadvantages of the related art.

An object of the present invention is to provide an IDCT system for a digital television receiver which performs an IDCT operation with respect to SD video signals and HD video signals in an integrated IDCT part.

Another object of the present invention is to provide an IDCT system for a digital television receiver performing a simple IDCT that covers 8×8 IDCT and 8×4 IDCT.

Still another object of the present invention is to provide an IDCT system for a digital television receiver which performs operation through a simple IDCT when producing outputs different from inputs in number through downsampling, and carries out filtering and decimation at the same time.

Still another object of the present invention is to provide an IDCT system for a digital television receiver which stores two kinds of coefficient values in read only memories, and selectively uses them according to the characteristics of an applied picture.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides an inverse discrete cosine transforming (IDCT) system for a digital television receiver performing a variable length decoding and an inverse quantization of an applied bit stream and an IDCT with respect to inversely quantized DCT coefficients, comprising an integrated IDCT part which performs an inverse discrete cosine transformation of standards DCT coefficients inversely quantized or high definition DCT coefficients inversely quantized.

According to another aspect of the present invention, An inverse discrete cosine transforming (IDCT) system for a digital television receiver performing picture data processing by blocks, and dividing the data processed by blocks into first and second groups to perform IDCT and downsampling (filtering and decimation) with respect to data of the first group and data of the second group to an M×N block and a K×L block (M×N>K×L), respectively; an operating part performing IDCT or IDCT/downsampling of the data processed by blocks; memories using input of picture size information, frame rate, scanning method, and receiving mode as control signals, and producing IDCT coefficient values in response to the control signal; and a control part controlling the operating part in response to the control signal to select an IDCT or IDCT/downsampling operation, and selectively producing a value stored in the memories. The system selectively performs an n-point 1-D IDCT mode and an n-point 1-D IDCT/downsampling mode. It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

Figure 1:
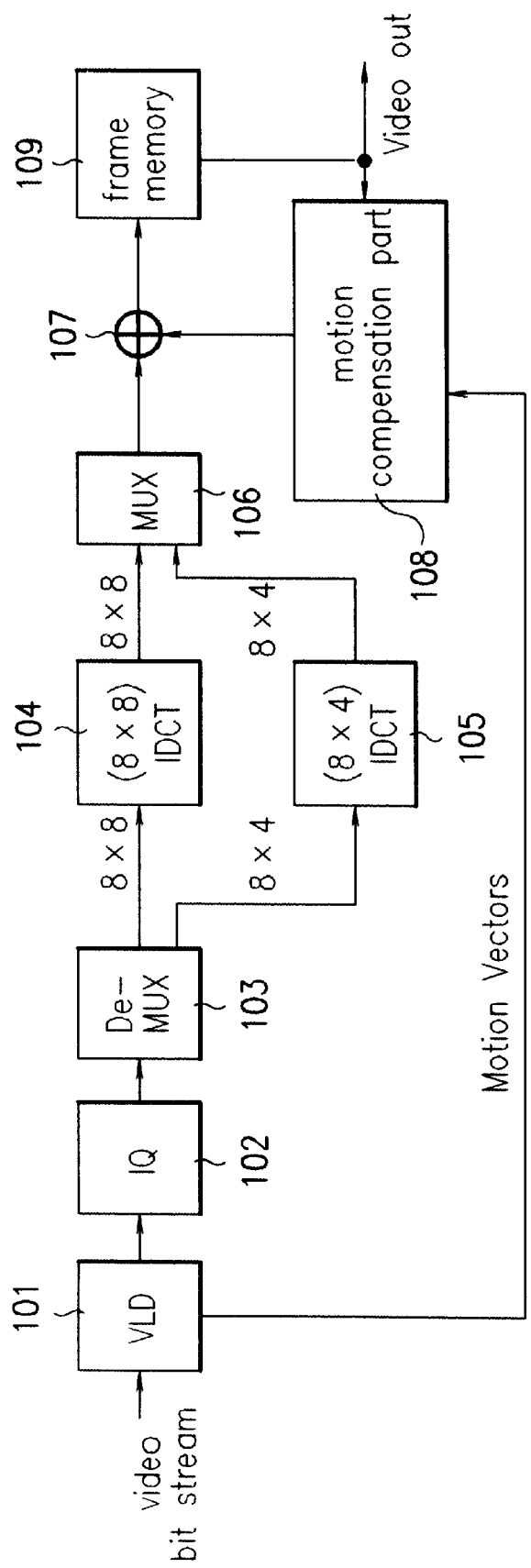
FIG. 1 is a block diagram of a decoder for a standard definition digital television receiver in accordance with a conventional art.
Figure 2A:
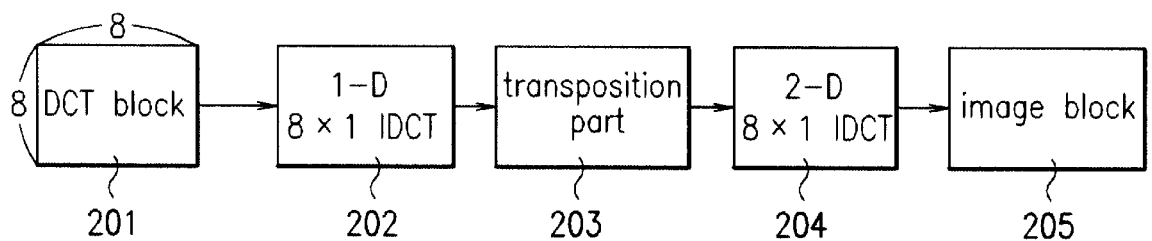
FIG. 2a is a block diagram of 8×8 two-dimensional IDCT part of FIG. 1.
Figure 2B:
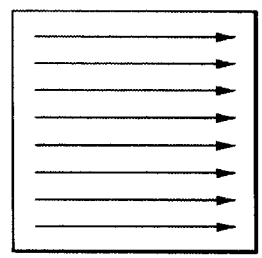
Figure 2C:
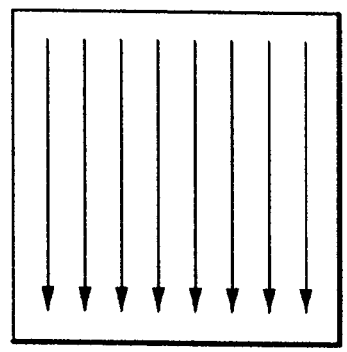
Figure 2D:
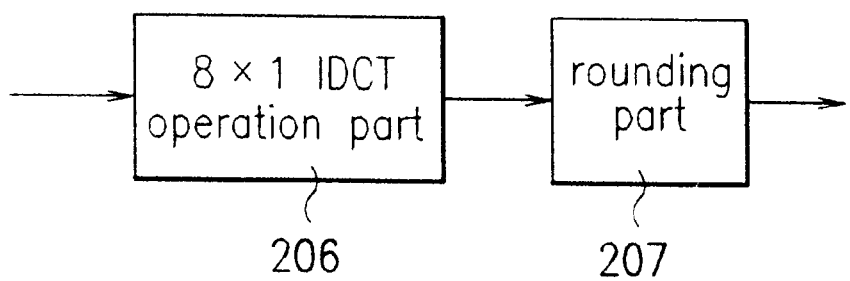
Figure 3A:
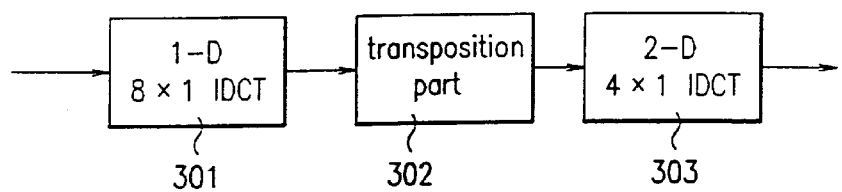
Figure 3B:
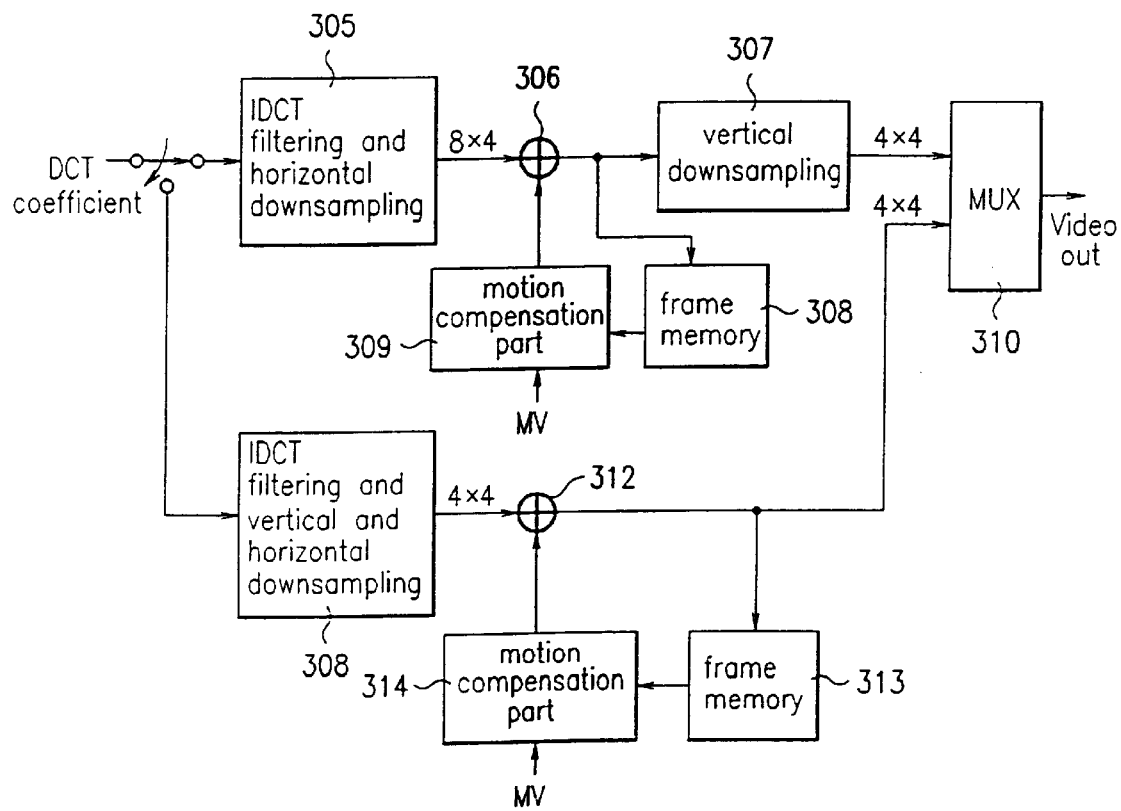
Figure 4:
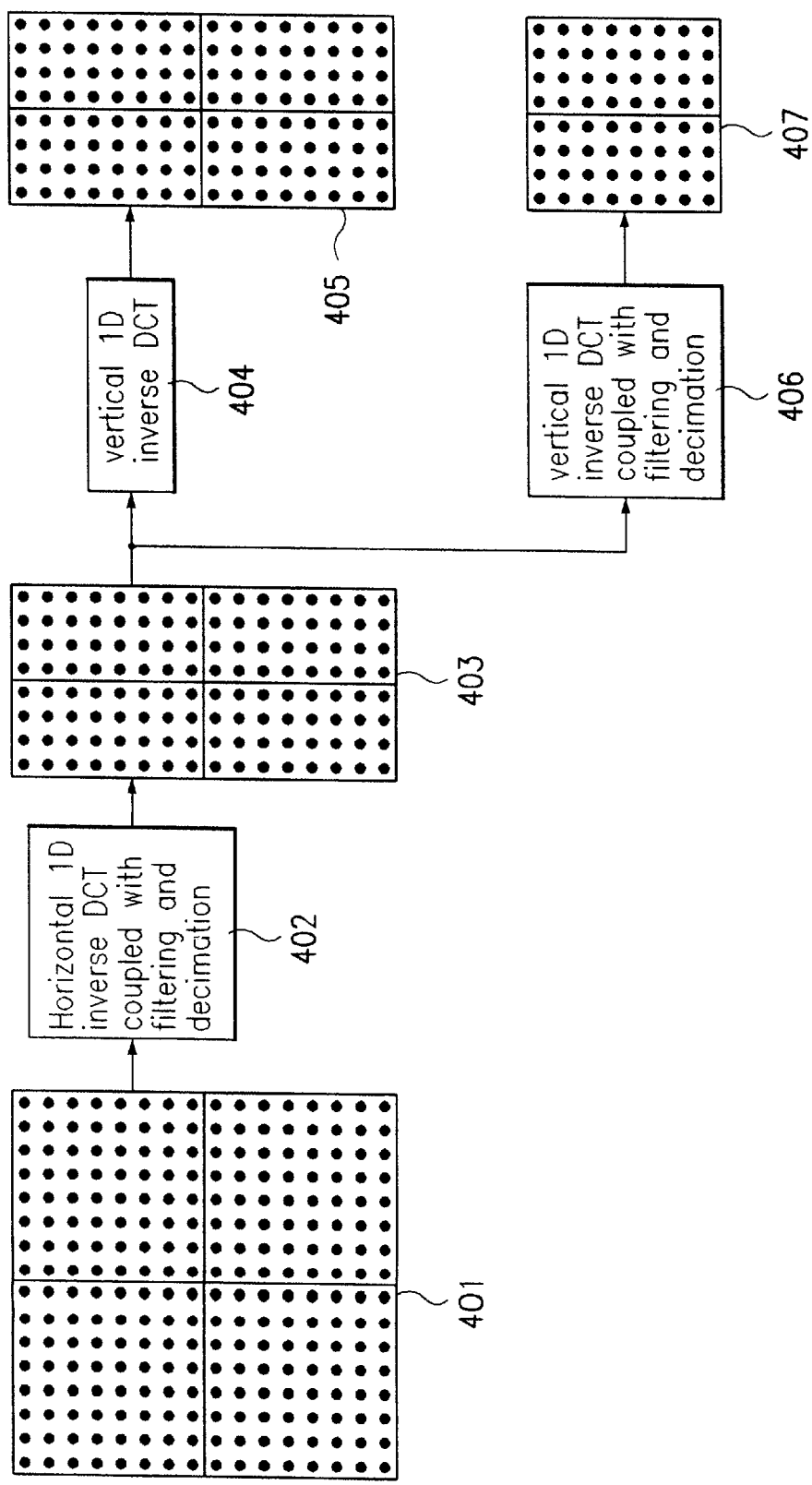
Figure 5:
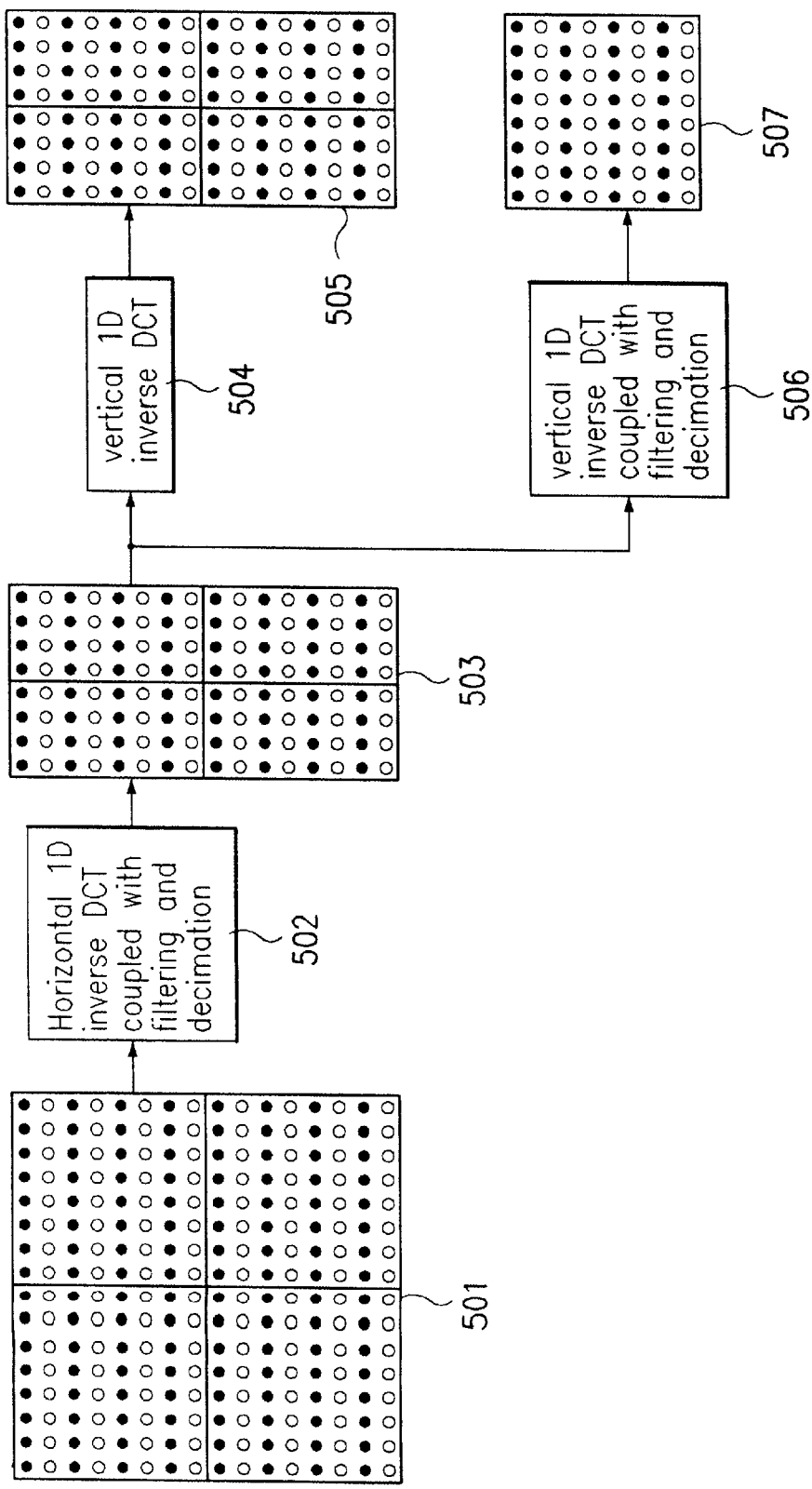
Figure 6A:
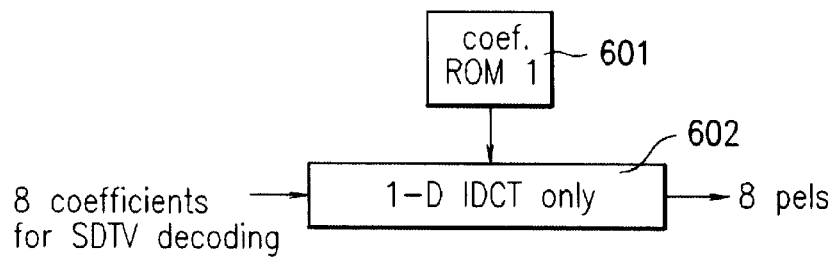
Figure 6B:
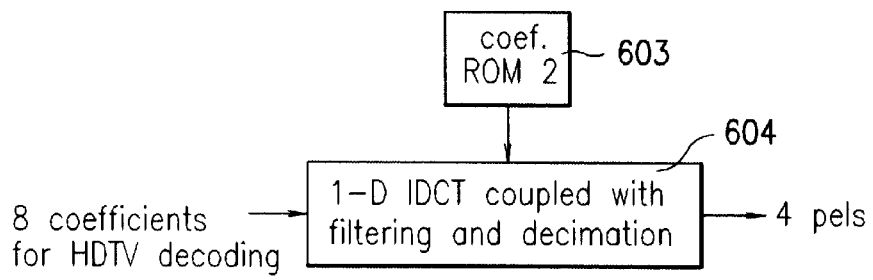
Figure 7:
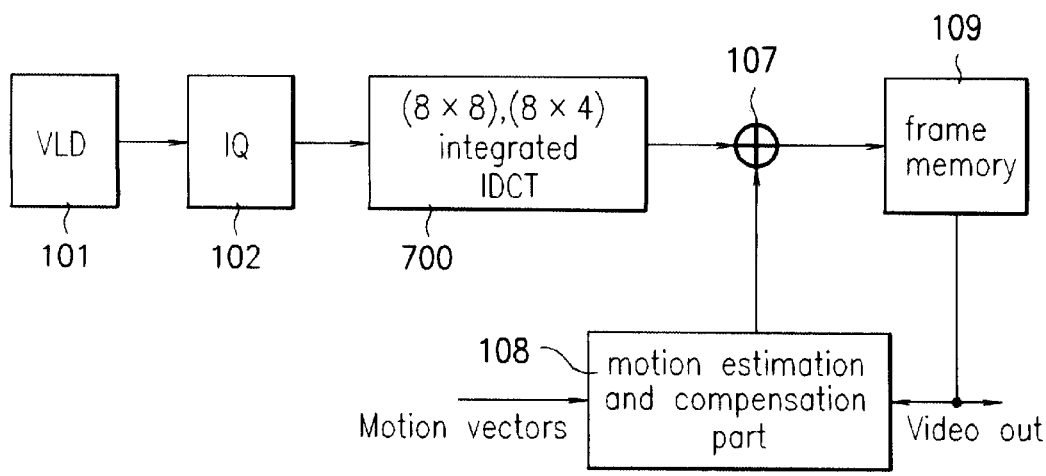
Figure 8:
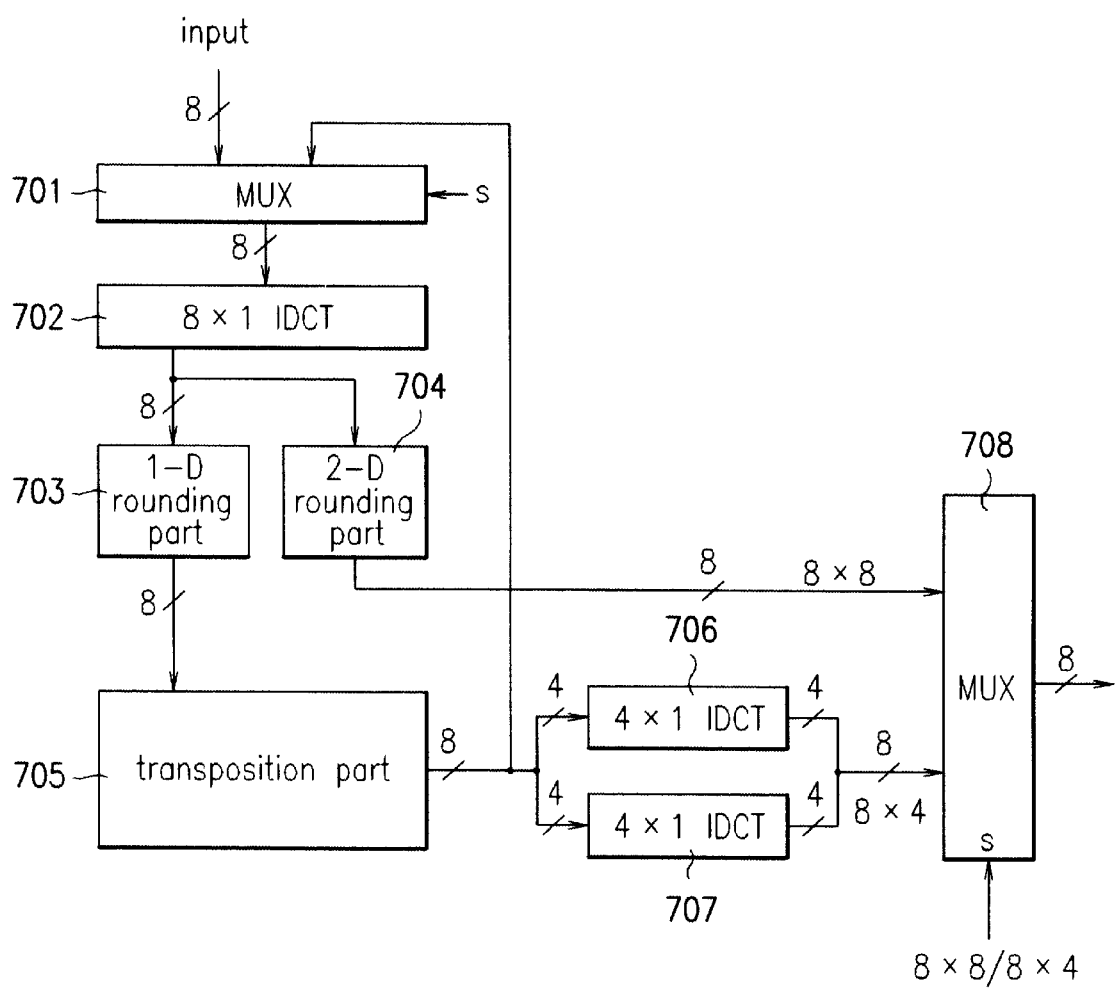
Figure 9:
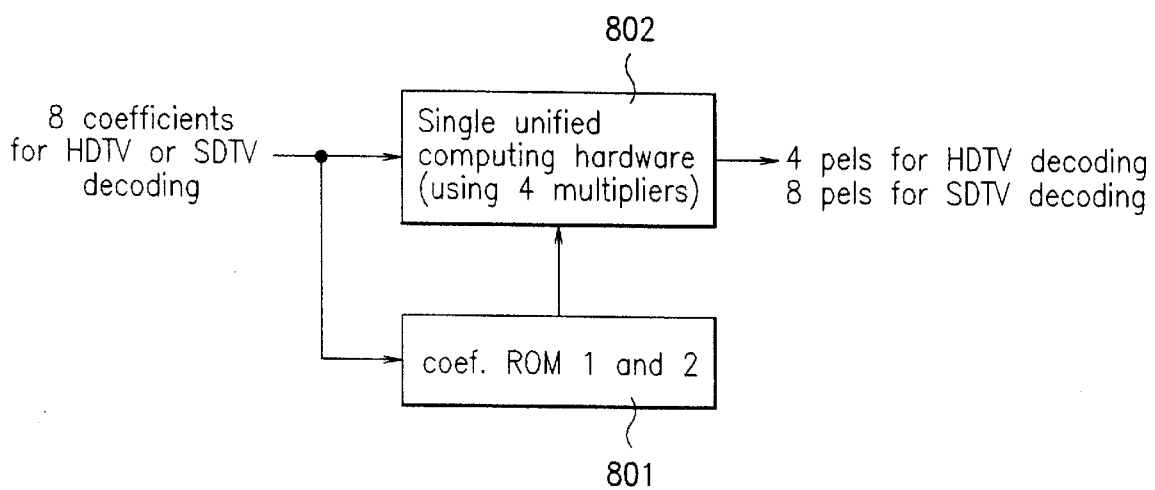
Figure 10:
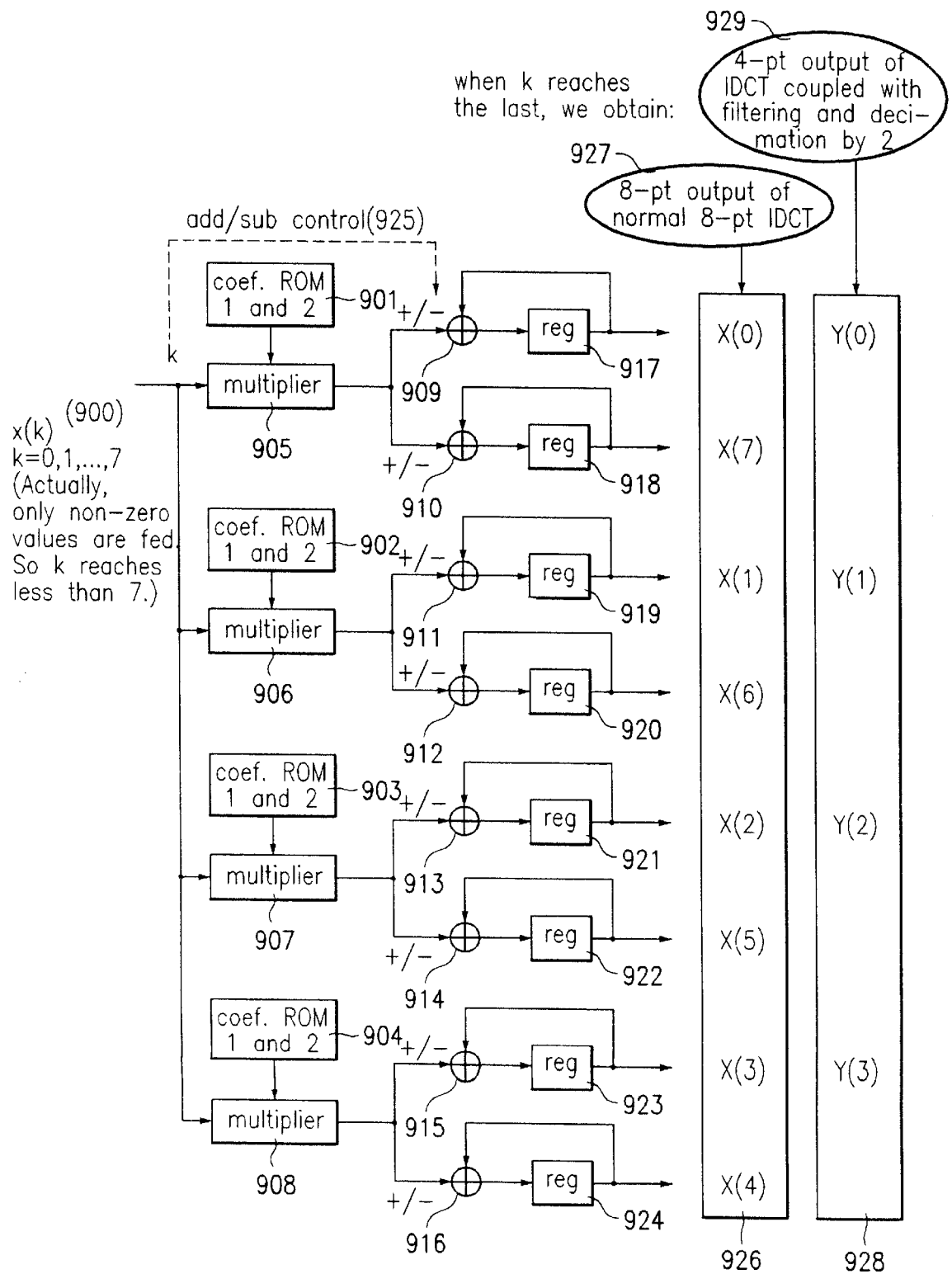

FIG. 2b relates to a preferred embodiment of the present invention for processing SD video signals, and depicts an IDCT step of an 8×1 IDCT part 202 of FIG. 2a;

FIG. 2c depicts an IDCT step of an 8×1 IDCT part 204 of FIG. 2a;

FIG. 2d is a detailed block diagram of 8×1 IDCT of FIG. 2a;

FIG. 3a depicts a preferred embodiment of the HD video signals, and is a block diagram of an 8×4 two-dimensional IDCT part of FIG. 1;

FIG. 3b depicts a block diagram for processing an HD class video signal in accordance with another preferred embodiment of the present invention;

FIG. 4 depicts an IDCT/decoding process of a picture of a progressive scanning of FIG. 3b;

FIG. 5 depicts an IDCT/decoding process of a picture of an interlaced scanning of FIG. 3b;

FIG. 6a relates to an embodiment of the 1-D IDCT for processing SD video signals;

FIG. 6b is a block diagram of a 1-D IDCT mechanism of FIG. 3b for HD video signals;

FIG. 7 is a block diagram of a video decoder to which the inventive integrated IDCT of the first preferred embodiment is applied;

FIG. 8 is a detailed block diagram of the integrated IDCT of the first preferred embodiment of the present invention;

FIG. 9 is a block diagram of the 1-D IDCT part of the integrated IDCT system in accordance with a second preferred embodiment of the present invention; and FIG. 10 is a detailed block diagram of the 1-D IDCT of FIG. 9.

DETAILED DESCRIPTION OF PREFERRED EMBODIMENT

Reference will now be made in detail to the preferred embodiments of the present invention, examples of which are illustrated in the accompanying drawings.

The present invention is described through first and second preferred embodiments concerning an integrated IDCT system producing DCT coefficients horizontally ½ downsampled in performance of an IDCT with respect to HD video signals; and an integrated IDCT system producing DCT coefficients horizontally/vertically ½ downsampled.

First Preferred Embodiment

In an 8×8 2-D IDCT of FIG. 2a and 8×4 2-D IDCT of FIG. 3a, a one-dimensional 8×1 IDCT is commonly used. In the first preferred embodiment of the present invention an 8×1 IDCT is used, and in case of 8×8 block, 8×1 block IDCT is performed again to complete 8×8 block 2-D IDCT. In case of 8×4 block, 4×1 block IDCT is performed to complete 8×4 block 2-D IDCT. In other words, 8×8 block 2-D IDCT and 8×4 block 2-D IDCT can be performed with the simple IDCT.

The video decoder of the present invention realizing the above mechanism is depicted in FIG. 7, and the integrated IDCT system of FIG. 7's video decoder is fully illustrated in FIG. 8.

Referring to FIG. 7, a VLD 101, an inverse quantizing part 102, an adder 107, a motion compensation part 108, and a frame memory 109 are of the same construction and perform the An same operation, and the detailed description thereabout will be omitted, and an integrated IDCT part 700 is now fully described.

Integrated IDCT part 700 is a single IDCT to which 8×8 IDCT and 8×4 IDCT are added, and is similar to the 8×8 IDCT in size, thus minimizing its size. Since the IDCT is an optimum algorithm processing image data and is selected as a standard block for the MPEG, it is advantageous to reduce the size to half.

Integrated IDCT part 700 that can cover the 8×4 block two-dimensional DCT as well as the 8×8 block two-dimensional IDCT is a basic block of the MPEG for SDTV, and is fully depicted in FIG. 8.

Referring to FIG. 8, integrated IDCT part 700 includes a multiplexer 701 selectively producing a value applied from or a value fed back from inversely quantizing part 102 according to a selection signal; an 8×1 IDCT operation part 702 performing an 8×1 IDCT with respect to an output of multiplexer 701; a first rounding part 703 performing one-dimensional rounding when 8×1 IDCT operation part 702 is performing one-dimensional 8×1 IDCT; a second rounding part 704 performing a two-dimensional rounding when 8×1 IDCT operation part 702 is performing two-dimensional 8×1 IDCT; a transposition part 705 performing 8×8 column-row transposing with respect to the data of which first rounding part 703 has performed one-dimensional rounding, in case of 8×8 IDCT and a then feeding the data back to multiplexer 701, and performing an 8×4 column-row transposition in case of 8×4 IDCT; 4×1 IDCT operation parts 706 and 707 performing 4×1 IDCT with respect to data produced from preposition part 705; and a multiplexer 708 selecting one of an 8×8 IDCT output 2-D rounded by second rounding part 704 and an 8×4 IDCT output synthesized by 4×1 IDCT operation parts 706 and 707. Two 4×1 IDCT operation parts 706 and 707 are used in order to set the operating frequency with 8×8 IDCT.

In the first preferred embodiment of the present invention, inversely quantizing part 102 produces inversely quantized 8×8 DCT coefficients intact to integrated IDCT part 700 if the applied signal is an SD signal, and removes a high frequency horizontal area of 8×8 DCT coefficients inversely quantized and then produces 8×4 DCT coefficients if the applied signal is an HD signal.

If a value applied to integrated IDCT part 700 is an 8×8 DCT coefficient, the final output is 8×8 block, and if it is an 8×8 DCT coefficient, the final output is 8×4 block.

That is, the selection signal s that determines if the IDCT is 8×8 or 8×4 in structure and determines 1-D 8×1 IDCT or 2-D 8×1 IDCT performance is applied to multiplexer 701 from a control part (not shown). Multiplexer 701 selects one of a value input from inversely quantizing part 102 or a value fed back from inversely quantizing part 102 to produce it to 8×1 IDCT operation part 702 in response to the selection signal s.

8×1 IDCT operation part 702 performs an 8×1 IDCT with respect to the data output through multiplexer 701, and performs operation by using the modified CHEN's fast algorithm. The 8×1 one-dimensional IDCT performance using the modified CHEN's fast algorithm is expressed as follows:

$$\begin{pmatrix} y0 & y7 \\ y1 & y6 \\ y2 & y5 \\ y3 & y4 \end{pmatrix} = \frac{1}{2}\begin{pmatrix} A & B & A & C \\ A & C & -A & -B \\ A & -C & -A & B \\ A & -B & A & -C \end{pmatrix}\begin{pmatrix} x0 \\ x2 \\ x4 \\ x6 \end{pmatrix} \pm$$ [EQUATION 3]

$$\frac{1}{2}\begin{pmatrix} D & E & F & G \\ E & -G & -D & -F \\ F & -D & G & E \\ G & -F & E & -D \end{pmatrix}\begin{pmatrix} x1 \\ x3 \\ x5 \\ x7 \end{pmatrix}$$

$$A = \cos\frac{\pi}{4}, B = \cos\frac{\pi}{8}, C = \sin\frac{\pi}{8},$$

$$D = \cos\frac{\pi}{16}, E = \cos\frac{3\pi}{16}, F = \sin\frac{3\pi}{16}, G = \sin\frac{\pi}{16}$$

In the equation, for example, y0 is obtained by "+" operation, and Y7 by "−" operation. When 8×1 IDCT operation part 702 performs a 1-D 8×1 IDCT by using the equation 3, first rounding part 703 performs a 1-D rounding to produce output data to preposition part 705, and when 8×1 IDCT operation part 702 performs a 2-D 8×1 IDCT, second rounding part 704 performs a 2-D rounding to produce output data to multiplexer 708. When the data of which first rounding part 703 has performed a first rounding is 8×8 block IDCT, transposition part 705 performs 8×8 column-row transposing to feed the data back to multiplexer 701, and when the data is 8×4 block IDCT, transposition part 705 performs a 8×4 column-row transposing to produce the output data to 4×1 IDCT operation parts 706 and 707. That is, in case of 8×4 block IDCT, the 8-bit data produced from transposition part 705 are divided by four bits and output to 4×1 IDCT operation parts 706 and 707, respectively. 4×1 IDCT operating parts 706 and 707 perform 4×1 IDCT of 4-bit data produced from transposition part 705 in case of using 8×4 IDCT, and the data are added to be 8-bit data again, thus being output to multiplexer 708.

The 4×1 1-D IDCT of 4×1 IDCT operation parts 706 and 707 is expressed as the following equation 4 by using the above equation 2.

$$\begin{pmatrix} y0 \\ y1 \\ y2 \\ y3 \end{pmatrix} = \frac{1}{2}\begin{pmatrix} A & B & A & C \\ A & C & -A & -B \\ A & -C & -A & B \\ A & -B & A & -C \end{pmatrix}\begin{pmatrix} x0 \\ x1 \\ x2 \\ x3 \end{pmatrix}$$ [EQUATION 4]

Referring to the equations 3 and 4, 8×1 IDCT and 4×1 IDCT matrixes are the same as each other in construction, and there is no problem in embodying 4×1 IDCT operation parts 706 and 707. Multiplexer 708 selectively produces 8×8 block IDCT output produced from second rounding part 704 if selection signal s indicates 8×8 block IDCT. When selection signal s indicates 8×4 block IDCT, multiplexer 708 selectively produces 8×4 block IDCT output from 4×1 IDCT operation parts 706 and 707 to adder 107.

According to the first preferred embodiment of the present invention, the single 8×1 IDCT is commonly used, in case of 8×8 block, it feeds back to operate the 8×1 IDCT to complete 8×8 2-D IDCT, and in case of 8×4 block, the 4×1 IDCT operates to complete 8×4 2-D IDCT, thus realizing a simple IDCT. This simple IDCT can perform 8×8 2-D IDCT and 8×4 2-D IDCT required for SDTVs, and its size is similar to the 8×8 block IDCT's. In addition, the exclusive 8×4 block IDCT can be realized in a way that 400 M samples/sec are available.

Second Preferred Embodiment

FIG. 9 is a block diagram showing an integrated IDCT in accordance with the second preferred embodiment of the present invention. An arithmetic circuit 802 using four multipliers receives HD or SD 8 DCT coefficients referring to a value of a ROM 801 having IDCT coefficients for each of SD and HD (previously stored in a known way), and produces image data IDCT/downsampled to four pixels in case of HD picture decoding. In case of SD picture decoding, arithmetic circuit 802 produces image data inversely discrete cosine transformed to 8 pixels. This concerns a method of sequentially inputting DCT coefficients from x0 to x7 in the equation 3.

An HD/SD selection control signal, a picture selection signal, and a field/frame selection signal are input from a control part (not shown), and used for address generation of the ROM. There is an adding or subtracting selection signal (+/−) for computing. Subtraction is required to obtain y7, y6, y5, and y4 pixels in the equation 3.

FIG. 10 is a detailed block diagram of FIG. 9's integrated IDCT. This integrated IDCT includes ROMs 901 to 904 for performing an integrated IDCT with respect to an HD or SD bit stream 900; four multipliers 905 to 908 multiplying the IDCT coefficient information, each provided from ROMs 901 to 904, to the applied bit stream; subtracters 909 to 916 receiving multiplied values and performing adding or subtraction with values fed back; registers 917 to 924 storing results output by subtracting or adding and feeding them back to respective subtracters 909 to 916. A control signal 925 controls the operation of subtracters 909 to 916.

A first multiplexer 926 and second multiplexer 927 are connected to registers 917 to 924, and first multiplexer 926 selects an SD 8-point output 97 of IDCT and second multiplexer 928 selects HD 4-point output 929 of IDCT coupled with filtering and decimation.

FIG. 10 depicts a 1-D IDCT/downsampler circuit, and a 2-D IDCT/downsamplier circuit can be realized by cascading this 1-D IDCT/downsampler circuit in two stages. The integrated IDCT circuit performs IDCT/downsampling for three cases. In other words, upon receipt of normal SD picture in FIG. 3b, the integrated IDCT circuit performs an 8×8 IDCT with respect to 8×8 block, and upon receipt of HD picture, it performs 8×4 IDCT/downsampling (filtering/decimation) with respect to 8×8 block of a picture of importance while it performs 4×4 IDCT/downsampling with respect to 8×8 block of a picture of no importance, which is based on the IDCT coefficient information stored in ROMs 901 to 904 corresponding to each case, and can be performed just by switching-controlling multiplexers 926 and 928.

In case of receipt of SD picture, first multiplexer 926 performs 8-point output, and in case of receipt of HD picture, second multiplexer 928 performs a 4-point output horizontally downsampled (1-D IDCT/downsampling) with respect to signals of a picture of importance and performs a 4-point output horizontally/vertically downsampled with respect to signals of a picture of no importance (2-D IDCT/downsampling, and FIG. 10'S 1-D IDCT circuit).

According to the second preferred embodiment of the present invention, when performing a downsampling to contain the more information with respect to the picture influencing the picture quality, compared to the one not influencing the picture quality, IDCT/downsamplers performing the IDCT/downsampling in different size can be unified into one.

As described above, according to the inventive IDCT system of the digital TV receiver, the SDTV receiver using the MPEG2 can process an SD picture and an HD picture in a single IDCT, thus minimizing its size and enhancing the processing speed and decreasing the overall production costs.

It will be apparent to those skilled in the art that various modifications and variations can be made in the IDCT system for a digital TV receiver of the present invention without departing from the spirit or scope of the invention. Thus, it is intended that the present invention cover the modifications and variations of this invention provided they come within the scope of the appended claims and their equivalents.

What is claimed is:

1. An inverse discrete cosine transforming (IDCT) system for a digital television receiver performing a variable length decoding and an inverse quantization of an applied bit stream and an IDCT with respect to inversely quantized DCT coefficients, comprising a single integrated IDCT part that selectively performs each of an N×N two-dimensional inverse discrete cosine transformation for standard definition DCT coefficients and an N×M two-dimensional (2-D) inverse discrete cosine transformation for high definition DCT coefficients based upon characteristics of the input bit stream, wherein N is an integer greater than M.

2. The IDCT system of claim 1, wherein the single integrated IDCT part has a single N×1 IDCT commonly used, wherein an 1-D output of the single N×1 IDCT feeds back to the N×1 single IDCT to complete the N×N 2-D DCT in case of an N×N block, and wherein an M×1 IDCT operates to complete the N×M 2-D IDCT according to the 1-D output in case of N×M block.

3. The IDCT system of claim 2, wherein N is equal to 8 and M is equal to 4.

4. The IDCT system of claim 1, wherein upon receipt of HD picture, 8×4 IDCT/down sampling is performed with respect to a picture of importance that acts on picture quality while 4×4 IDCT/down sampling is performed with respect to a picture of non-importance that does not act on picture quality.

5. The IDCT system of claim 1, wherein the single integrated IDCT part comprises:
   first N×1 IDCT means for performing inverse discrete cosine transformation;
   transposition means coupled for receiving an 1-D output of the first N×1 IDCT means; and
   second M×1 IDCT means coupled for receiving an output of the transposition means and for performing the inverse discrete cosine transformation to complete the N×M 2-D IDCT according to the 1-D output in case of an N×M block, wherein the output of the transposition means is fed back to the first N×1 IDCT means for performing the inverse discrete cosine transformation to complete the N×N 2-D DCT in case of an N×N block.

6. The IDCT system of claim 5, wherein N is equal to 8 and M is equal to 4.

7. The IDCT system of claim 1, wherein the single integrated IDCT part includes a single N×1 IDCT commonly used to process the standard definition DCT coefficients and the high definition DCT coefficients, wherein the single N×1 IDCT is used twice to complete the N×N 2-D DCT for the standard definition DCT coefficients in case of an N×N block, and wherein the single N×1 IDCT is used once when performing the N×M 2-D IDCT for the high definition DCT coefficients.

8. An inverse discrete cosine transforming (IDCT) system for a digital television receiver performing a variable length decoding and inverse quantization of an applied bit stream and an IDCT with respect to inversely quantized DCT coefficients, comprising:

a first multiplexer selectively producing a value inversely quantized or a value fed back in response to a selection signal;

an 8×1 IDCT operation part performing an 8×1 IDCT with respect to an output of the first multiplexer;

a rounding part performing a one-dimensional rounding when the 8×1 IDCT operation part is performing one-dimensional 8×1 IDCT, and performing a two-dimensional rounding when the 8×1 IDCT operation part is performing two dimensional 8×1 IDCT;

a transposition part performing an 8×8 column-row transposing with respect to data of which the rounding part has performed a one-dimensional rounding in case of 8×8 block IDCT, and feeding the data back to the first multiplexer for two-dimensional 8×1 IDCT operation, and performing an 8×4 column-row transposing with respect to the data in case of 8×4 block IDCT and producing output data;

a 4×1 IDCT operation part performing a 4×1 IDCT with respect to output data of the transposition part; and a second multiplexer selectively producing one of data of 8×8 IDCT of which the rounding part has performed the two-dimensional rounding, and data of 8×4 IDCT of which the 4×1 IDCT operation part has performed the 4×1 IDCT, in response to a selection signal.

9. An inverse discrete cosine transforming (IDCT) system according to claim 8, wherein the 8×1 IDCT operation part performs an 8×1 IDCT with respect to data applied according to a modified CHEN's fast algorithm.

10. An inverse discrete cosine transforming (IDCT) system according to claim 8, wherein the 8×1 IDCT operation part receives inversely quantized DCT coefficients of 8×8 block if inversely quantized DCT coefficients are standard-definition ones, and receives DCT coefficients of 8×4 block if the inversely quantized DCT coefficients are high-definition ones.

11. An inverse discrete cosine transforming (IDCT) system for a digital television receiver performing picture data processing by blocks, and dividing the data processed by blocks into first and second groups to perform IDCT and downsampling (filtering and decimation) with respect to data of the first group and data of the second group to an M×N block and a K×L block (M×N>K×L), respectively;

operating means performing IDCT or IDCT/downsampling of the data processed by blocks;

storage means using the input of picture size, frame rate, scanning method, and receiving mode as control signals, and producing IDCT coefficient values in response to the control signal; and control means controlling the operating means in response to the control signal to select an IDCT or IDCT/downsampling operation, and selectively producing a value stored in the storage means, said system selectively performing an n-point 1-D IDCT mode and an n-point 1-D IDCT/downsampling mode.

12. An inverse discrete cosine transforming (IDCT) system according to claim 11, wherein a 2-D IDCT/downsampling is performed with respect to the data of the second group by two-stage cascading the 1-D IDCT/downsampler performing the IDCT and downsampling.

13. An inverse discrete cosine transforming (IDCT) system according to claim 11, wherein the 8-point 1-D IDCT/downsampler, producing 8-point output of 1-D IDCT and 4-point output of 1-D IDCT, is embodied in a single circuit having four multipliers.

14. An inverse discrete cosine transforming (IDCT) system for a digital television receiver performing a variable length decoding and inverse quantization of an applied bit stream and an IDCT with respect to inversely quantized DCT coefficients, comprising:

first multiplexer means for selectively producing a value inversely quantized or a value fed back in response to a selection signal;

an N×1 IDCT operation means for performing an N×1 IDCT with respect to an output of the first multiplexer means;

rounding means for performing a one-dimensional rounding when the N×1 IDCT operation means performs one-dimensional N×1 IDCT operation, and performing a two-dimensional rounding when the N×1 IDCT operation means performs two dimensional N×1 IDCT operation;

transposition means for performing an N×N column-row transposing with respect to data of which the rounding means has performed the one-dimensional rounding for an N×N block IDCT, and feeding the data back to the first multiplexer means for the two-dimensional N×1 IDCT operation, and performing an N×M column-row transposing with respect to the data for an N×M block IDCT and producing output data;

M×1 IDCT operation means for performing an M×1 IDCT with respect to the output data of the transposition means; and second multiplexer means for selectively producing one of data of the N×N block IDCT of which the rounding means has performed the two-dimensional rounding and data of the N×M block IDCT of which the M×1 IDCT operation means has performed the M×1 IDCT, in response to the selection signal, wherein N and M are integers so that N is greater than M.

* * * * *